(12) United States Patent
Montero et al.

(10) Patent No.: US 10,355,505 B2
(45) Date of Patent: Jul. 16, 2019

(54) METHOD FOR ADAPTER OVER-CURRENT-PROTECTION (OCP) PROTECTION AND USER WARNING

(71) Applicant: Dell Products L.P., Round Rock, TX (US)

(72) Inventors: Adolfo S. Montero, Pflugerville, TX (US); Chung-Wei Wang, Taipei (TW); Jih-Peng Yeh, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 596 days.

(21) Appl. No.: 14/202,341

(22) Filed: Mar. 10, 2014

(65) Prior Publication Data

US 2015/0253830 A1 Sep. 10, 2015

(51) Int. Cl.
| | | |
|---|---|---|
| *G06F 11/30* | (2006.01) | |
| *H02J 7/00* | (2006.01) | |
| *G06F 1/28* | (2006.01) | |
| *G06F 1/3203* | (2019.01) | |
| *G06F 1/26* | (2006.01) | |

(52) U.S. Cl.
CPC .............. *H02J 7/0068* (2013.01); *G06F 1/28* (2013.01); *G06F 1/26* (2013.01); *G06F 1/3203* (2013.01); *Y10T 307/625* (2015.04)

(58) Field of Classification Search
CPC ............ G06F 21/81; G06F 1/03; G06F 1/3203
USPC ........................................................ 713/340
See application file for complete search history.

(56) References Cited

U.S. PATENT DOCUMENTS

| | | | | |
|---|---|---|---|---|
| 5,245,523 A | * | 9/1993 | Juzswik | H02H 7/0838 318/599 |
| 5,802,379 A | * | 9/1998 | Boatwright | G06F 1/30 713/323 |
| 5,856,917 A | * | 1/1999 | Aonuma | H02M 1/4225 323/222 |
| 6,504,691 B1 | * | 1/2003 | Matsui | H05B 41/2851 361/38 |
| 6,750,409 B1 | * | 6/2004 | Samodell | H01H 9/0066 200/1 B |

(Continued)

*Primary Examiner* — Volvick Derose
(74) *Attorney, Agent, or Firm* — Terrile, Cannatti & Chambers; Stephen A. Terrile

(57) ABSTRACT

A system, method, and computer-readable medium are disclosed for detecting when a lower power adapter is coupled with an information handling system having higher power requirements. More specifically, in certain embodiments, a circuit (such as an embedded controller (EC)) detects an adapter wattage when an adapter plug-in is detected. If a lower wattage power adapter is detected (e.g., a 45 W power adapter), the embedded controller activates a signal (e.g., an AC_DISABLE signal) to stop powering the information handling system from the adapter. In certain embodiments, the information handling system is powered from a battery associated with the information handling system when the power adapter power capacity does not satisfy the power requirements of the information handling system. In certain embodiments, the circuit substantially simultaneously generates a low power warning. In certain embodiments, the adapter wattage may be detected via an adapter identifier (e.g., power supply identifier (PSID) signal) which is provided via a bus such as a single line bus.

15 Claims, 3 Drawing Sheets

(56) References Cited

U.S. PATENT DOCUMENTS

| | | | | |
|---|---|---|---|---|
| 7,525,291 | B1* | 4/2009 | Ferguson | H02J 7/0021 320/128 |
| 7,581,119 | B2* | 8/2009 | Tupman | G06F 1/266 713/300 |
| 8,700,942 | B2* | 4/2014 | Morimura | G06F 1/263 713/320 |
| 2004/0070996 | A1* | 4/2004 | Carr | H02M 3/33523 363/21.01 |
| 2004/0075419 | A1* | 4/2004 | Massey | H02J 1/14 320/117 |
| 2006/0020833 | A1* | 1/2006 | Critz | G06F 11/00 713/300 |
| 2006/0082960 | A1* | 4/2006 | Breen | G06F 1/263 361/679.4 |
| 2006/0085658 | A1 | 4/2006 | Allen et al. | |
| 2006/0103996 | A1* | 5/2006 | Carroll | G06F 1/3203 361/90 |
| 2006/0139015 | A1* | 6/2006 | Dinh | H02M 3/1584 323/272 |
| 2006/0232244 | A1* | 10/2006 | Vieira Formenti | H02J 7/027 320/128 |
| 2006/0242439 | A1* | 10/2006 | Hupman | G06F 1/3203 713/320 |
| 2007/0035183 | A1* | 2/2007 | Shimizu | H02J 9/061 307/126 |
| 2007/0138999 | A1* | 6/2007 | Lee | H02J 7/00 320/107 |
| 2007/0250722 | A1* | 10/2007 | Montero | G06F 1/263 713/300 |
| 2007/0288775 | A1* | 12/2007 | Allen | G06F 1/26 713/300 |
| 2008/0054863 | A1* | 3/2008 | Chuang | H01M 10/48 323/262 |
| 2008/0123378 | A1* | 5/2008 | Chiang | H02M 1/32 363/80 |
| 2008/0204956 | A1* | 8/2008 | Hung | H05B 39/08 361/91.1 |
| 2009/0039844 | A1* | 2/2009 | Hoshino | G05F 1/575 323/273 |
| 2009/0177906 | A1* | 7/2009 | Paniagua, Jr. | G06F 1/26 713/340 |
| 2010/0088533 | A1* | 4/2010 | Benhase | G06F 1/28 713/340 |
| 2010/0164301 | A1* | 7/2010 | Chang | H02M 7/00 307/125 |
| 2010/0283330 | A1* | 11/2010 | Lanni | H02J 1/00 307/149 |
| 2010/0306565 | A1* | 12/2010 | Umedu | G06F 1/266 713/324 |
| 2011/0219255 | A1* | 9/2011 | Hsieh | G06F 1/26 713/340 |
| 2012/0071215 | A1* | 3/2012 | Bourque | G06F 1/266 455/573 |
| 2012/0191988 | A1* | 7/2012 | Li | G06F 1/26 713/300 |
| 2012/0280563 | A1* | 11/2012 | Smith | G06F 1/263 307/2 |
| 2013/0049487 | A1* | 2/2013 | Lanni | H02M 1/10 307/151 |
| 2013/0300195 | A1* | 11/2013 | Meng | H02J 9/062 307/23 |
| 2014/0327425 | A1* | 11/2014 | Lin | G05F 1/46 323/349 |
| 2014/0347011 | A1* | 11/2014 | Song | H02J 7/0014 320/134 |
| 2015/0185260 | A1* | 7/2015 | Uan-Zo-Li | G01R 21/00 324/76.11 |

* cited by examiner

METHOD FOR ADAPTER OVER-CURRENT-PROTECTION (OCP) PROTECTION AND USER WARNING

BACKGROUND OF THE INVENTION

Field of the Invention

The present invention relates to the management of information handling systems. More specifically, embodiments of the invention provide a system, method, and computer-readable medium for detecting when a lower power adapter is coupled with an information handling system having higher power requirements.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to provide information handling systems, particularly portable information handling systems, with power adapters. Some information handling systems may require more power than other information handling systems. Systems which require more power are often provided with corresponding higher wattage power adapters (e.g., 240 Watt or 180 Watt power adapters). However, it is possible that certain customers may have also acquired (or otherwise have access to) a lower wattage power adapter (e.g., a 65 Watt power adapter). An issue can arise when a system which requires a higher wattage power adapter is accidentally coupled to a lower wattage power adapter. An issue can also arise due to certain mechanical compatibility issues between a power adapter and an information handling system. In these situations, an adapter over current protection (OCP) condition may occur. An adapter OCP condition can cause the information handling system to be damaged or to improperly operate where the improper operation can include failure to power-on, undesirable system throttling and unexpected shutdowns.

SUMMARY OF THE INVENTION

A system, method, and computer-readable medium are disclosed for detecting when a lower power adapter is coupled with an information handling system having higher power requirements. More specifically, in certain embodiments, a circuit (such as an embedded controller (EC) detects an adapter wattage when an adapter plug-in is detected. If a lower wattage power adapter is detected (e.g., a 45 W power adapter), the embedded controller activates a signal (e.g., an AC_DISABLE signal) to stop powering the information handling system from the adapter. In certain embodiments, the circuit substantially simultaneously generates a low power warning. In certain embodiments, the adapter wattage may be detected via an adapter identifier (e.g., power supply identifier (PSID) signal) which is provided via a bus such as a single line bus. Also, in certain embodiments, the low power warning includes a visual warning e.g., flashing a Power LED continuously) to warn a user of an adapter power condition.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
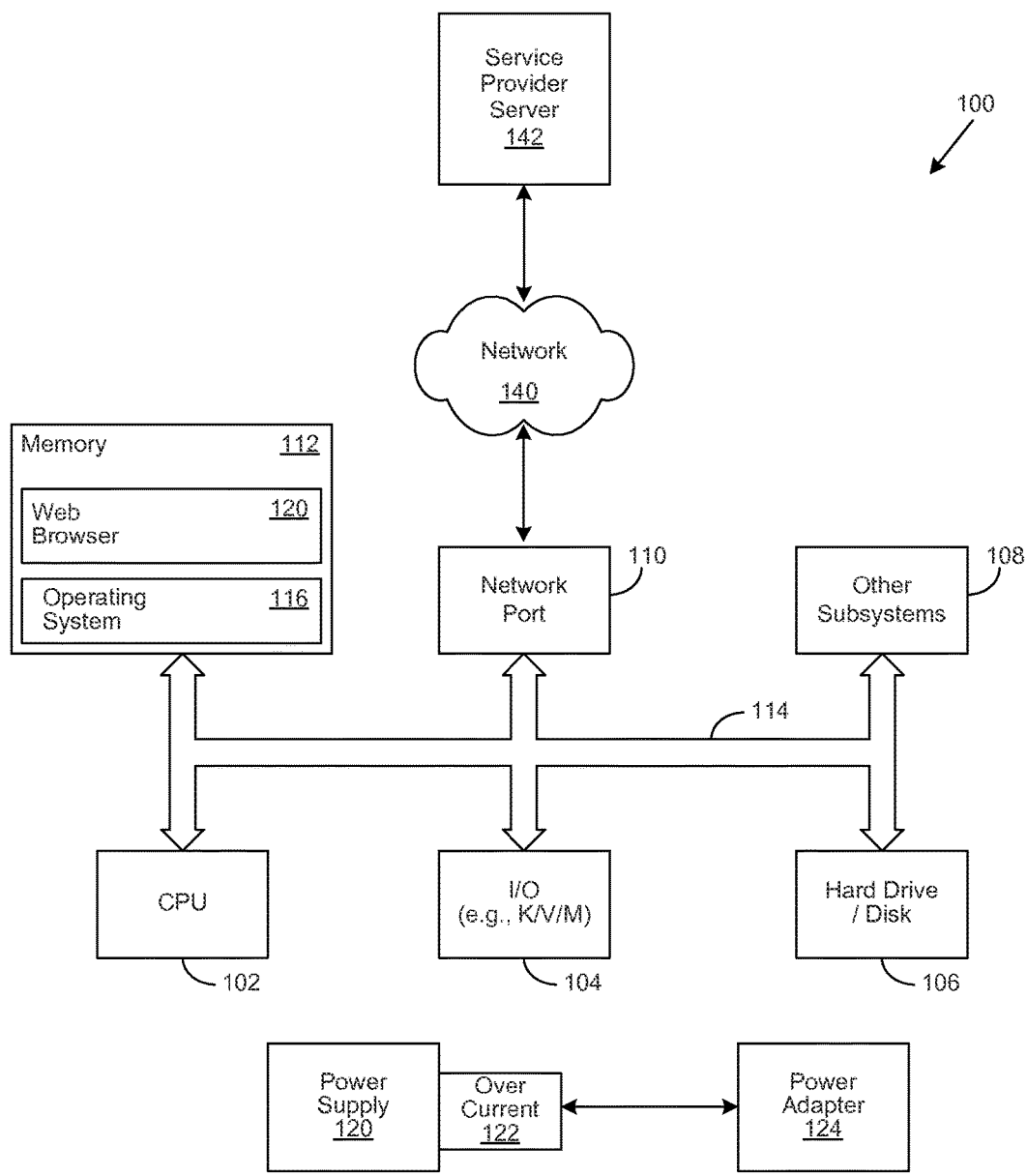
FIG. 1 shows a general illustration of components of an information handling system as implemented in the system and method of the present invention.

Referring to FIG. 1, a generalized illustration of an information handling system 100 that can be used to implement the system and method of the present invention is shown. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116. Additionally, the information handlings system 100 further includes a power supply 120 as well as a power protection system protection system 122 (which in certain embodiments comprises an adapter override system). One or both of the power supply 120 and the adapter override system 122 are coupled to a power adapter 124. In certain embodiments, the adapter override system 122 is included within the power supply 120.

The adapter override system 122 detects when a lower power adapter is coupled with an information handling system having higher power requirements. More specifically, in certain embodiments, a circuit (such as an embedded controller (EC)) detects an adapter wattage when an adapter plug-in is detected. If a lower wattage power adapter is detected (e.g., a 45 W or 65 W power adapter), the embedded controller activates a signal (e.g., an AC_DISABLE signal) to stop powering the information handling system from the adapter. In certain embodiments, the circuit substantially simultaneously generates a low power warning. In certain embodiments, the power adapter wattage may be detected via an adapter identifier (e.g., power supply identifier (PSID) signal) which is provided via a bus such as a single line bus. Also, in certain embodiments, the low power warning includes a visual warning (e.g., flashing a Power LED continuously) to warn a user of an adapter power condition.

Figure 2:
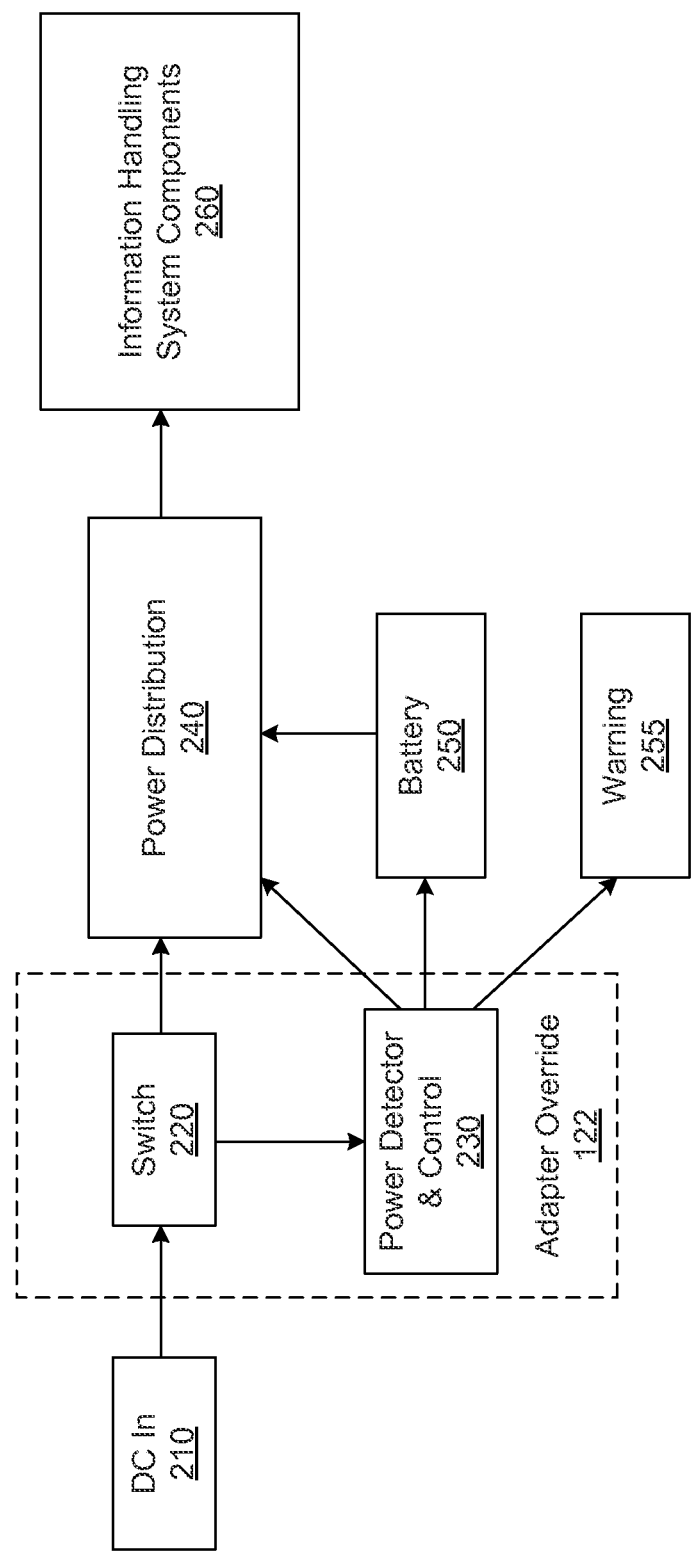
FIG. 2 shows a simplified schematic diagram of an adapter override circuit.

Referring to FIG. 2, a simplified schematic diagram of an adapter override circuit 122 interacting within an information handling system 100 is shown. More specifically, the adapter override circuit 122 includes a switch 220 (which in certain embodiments may comprise a field effect transistor (FET) as well as a power detector and control circuit 230 (which in certain embodiments may comprise an embedded controller (EC)). The adapter override circuit 122 is coupled between a DC input 210 and power distribution 240 of the information handling system (e.g., via certain layers of a printed circuit board) as well as a battery 250 of the information handling system 100 and a warning circuit 255. The power distribution 240 is in turn coupled to the various information handling system components (e.g., some or all of the processor 102, etc. shown in FIG. 1.)

The adapter override system 122 detects when a lower power adapter is coupled with an information handling system having higher power requirements. More specifically, in certain embodiments, the power detector and control circuit 230 detects an adapter wattage (from the DC input 210) when an adapter plug-in is detected. If a lower wattage power adapter is detected (e.g., a 45 W or 65 W power adapter), the power detector and control circuit 230 activates a signal (e.g., an AC_DISABLE signal) to cause the switch 220 to stop powering the information handling system components 260 from the adapter. In certain embodiments, the circuit substantially simultaneously causes the warning circuit 255 to generate a low power warning. In certain embodiments, the power adapter wattage may be detected via an adapter identifier (e.g., power supply identifier (PSID) signal) which is provided via a bus such as a single line bus. Also, in certain embodiments, the low power warning circuit 255 includes circuitry for generating a visual warning (e.g., flashing a Power LED continuously) to warn a user of an adapter power condition.

Figure 3:
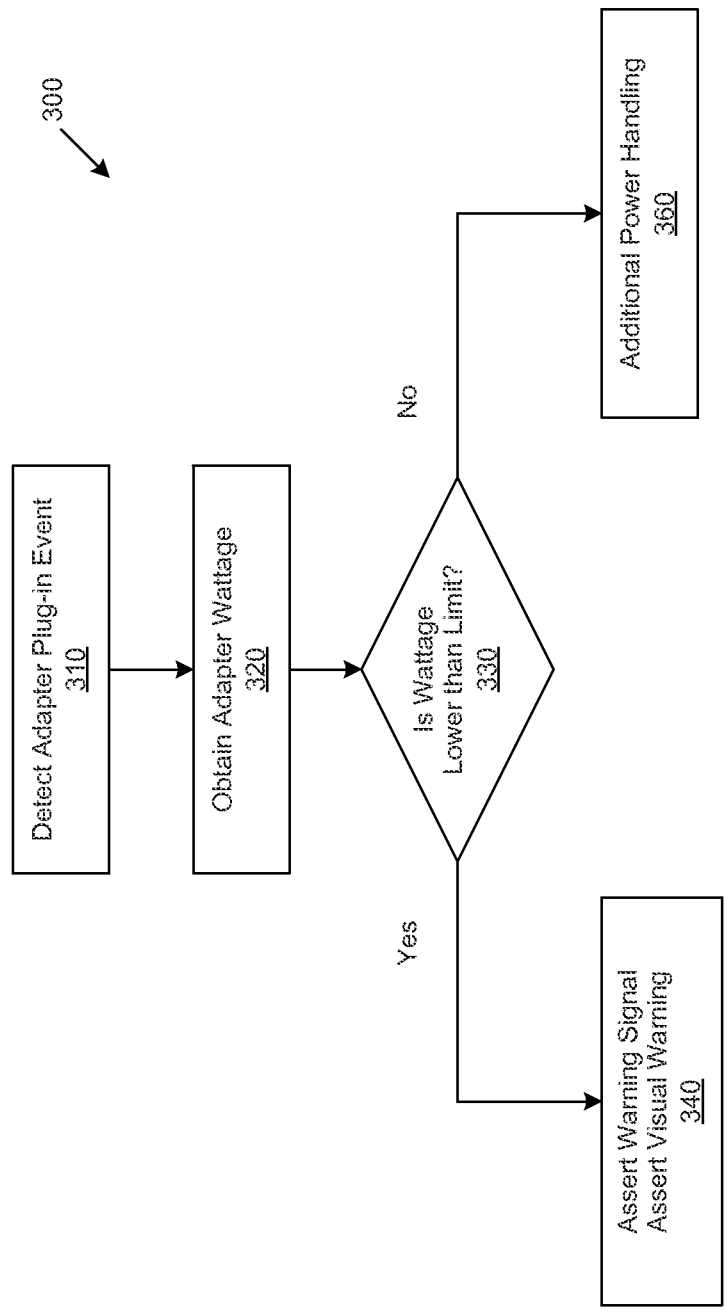
FIG. 3 shows a flow chart of the operation of an adapter override system.

Referring to FIG. 3, a flow chart of the operation 300 of an adapter override system is shown. More specifically, the adapter override system 122 begins operation by detecting a power adapter plug-in event at step 310. Next, at step 320, the adapter override system 122 obtains the wattage of the power adapter 124. In certain embodiments, the wattage of the power adapter 124 is obtained from a PSID signal. Next at step 330, the adapter override system 122 determines whether the wattage of the power adapter is smaller than a predefined power limit. With certain higher power information handling systems, the predefined power limit is set to substantially (i.e., within 5%) of 90 Watts. In certain embodiments, the predefined power limit is set according to theoretical maximum power consumption under substantially full software and/or peripheral loading. If the wattage is lower than the predefined limit, then at step 340 the adapter override system 122 asserts a low power warning signal (AC_DIS). In various embodiments, detection of the lower power adapter (as may be indicated via the low power warning signal) causes the adapter override system 122 to switch to powering the information handling system via the battery of the information handling system. Because the battery associated with the higher power information handling system is designed to power the higher power information handling system, the battery is a better power source than the power adapter. Accordingly the powering of the information handling system via the power adapter is purposely turned off.

Additionally, in certain embodiments, the adapter override system 122 generates a visual warning (e.g., flashing a Power LED continuously) to warn a user of an adapter power condition.

If the wattage is not lower than the predefined limit, then at step 360, the adapter override system 122 proceeds with additional power handling operations such as protecting the information handling system 100 from consuming current beyond a rated capacity of the AC adapter. This protection may include reducing power use of the information handling system 100 by turning off charging or by throttling the capabilities of the processor and video. This throttling continues until the current consumption is within an acceptable level.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents all respects.

What is claimed is:

1. A computer-implementable method for detecting whether a power adapter is coupled with an information handling system satisfies certain power requirements of the information handling system, the method comprising:

detecting when a power adapter is coupled to the information handling system;
determining a power adapter power capacity upon detection of coupling of the power adapter to the information handling system;
determining whether the power adapter power capacity satisfies the power requirements of the information handling system; and,
preventing the power adapter from powering the information handling system when the power adapter power capacity does not satisfy the power requirements of the information handling system via an adapter override circuit, the adapter override circuit being included within the information handling system, the adapter override circuit comprising a power detector control circuit and a switch, the switch of the adapter override circuit being located between the power adapter and power distribution of the information handling system, the power distribution comprising a layer of a printed circuit board, the power detector and control circuit activating a power adapter disable signal when the power adapter power capacity is lower than the power requirements of the information handling system, the power adapter disable signal causing the switch to stop powering the information handling system from the power adapter.

2. The method of claim 1, further comprising:
powering the information handling system from a battery associated with the information handling system when the power adapter power capacity does not satisfy the power requirements of the information handling system, the battery being coupled between the power detector control circuit and the power distribution of the information handling system, the powering the information handling system from the battery being controlled by the power detector control circuit.

3. The method of claim 1, further comprising:
generating a low power warning via the adapter override circuit to inform a user that the power adapter power capacity does not satisfy the power requirements of the information handling system, the low power warning comprising a visual warning to warn the user of an adapter power condition.

4. The method of claim 1, wherein:
the power adapter power capacity is detected via an adapter identifier.

5. The method of claim 4, wherein:
the adapter identifier comprises a power supply identifier (PSID) signal, the PSID signal being provided to the information handling system via a single line bus.

6. A system comprising:
a processor;
a data bus coupled to the processor;
a power supply coupled to the processor and the data bus; and,
a power protection system, the power protection system detecting whether a power adapter coupled with the information handling system satisfies certain power requirements of the information handling system, the power detection system comprising an adapter override circuit, the power protection system being configured for:
detecting when a power adapter is coupled to the information handling system;
determining a power adapter power capacity upon detection of coupling of the power adapter to the information handling system;

determining whether the power adapter power capacity satisfies the power requirements of the information handling system; and, preventing the power adapter from powering the information handling system when the power adapter power capacity does not satisfy the power requirements of the information handling system via the adapter override circuit, the adapter override circuit comprising a power detector control circuit and a switch, the switch of the adapter override circuit being located between the power adapter and power distribution of the information handling system, the power distribution comprising a layer of a printed circuit board, the power detector and control circuit activating a power adapter disable signal when the power adapter power capacity is lower than the power requirements of the information handling system, the power adapter disable signal causing the switch to stop powering the information handling system from the power adapter.

7. The system of claim 6, wherein the power protection system is further configured for:

powering the information handling system from a battery associated with the information handling system when the power adapter power capacity does not satisfy the power requirements of the information handling system, the battery being coupled between the power detector control circuit and the power distribution of the information handling system, the powering the information handling system from the battery being controlled by the power detector control circuit.

8. The system of claim 6, wherein the power protection system is further configured for:

generating a low power warning via the adapter override circuit to inform a user that the power adapter power capacity does not satisfy the power requirements of the information handling system, the low power warning comprising a visual warning to warn the user of an adapter power condition.

9. The system of claim 6, wherein:

the power adapter power capacity is detected via an adapter identifier.

10. The system of claim 9, wherein:

the adapter identifier comprises a power supply identifier (PSID) signal, the PSID signal being provided to the information handling system via a single line bus.

11. A power protection system, the power protection system detecting whether a power adapter coupled with the information handling system satisfies certain power requirements of the information handling system comprising:

circuitry for detecting when a power adapter is coupled to the information handling system;

circuitry for determining a power adapter power capacity upon detection of coupling of the power adapter to the information handling system;

circuitry for determining whether the power adapter power capacity satisfies the power requirements of the information handling system; and, circuitry for preventing the power adapter from powering the information handling system when the power adapter power capacity does not satisfy the power requirements of the information handling system via an adapter override circuit, the adapter override circuit comprising a power detector control circuit and a switch, the adapter override circuit being included within the information handling system, the switch of the adapter override circuit being located between the power adapter and power distribution of the information handling system, the power distribution comprising a layer of a printed circuit board, the power detector and control circuit activating a power adapter disable signal when the power adapter power capacity is lower than the power requirements of the information handling system, the power adapter disable signal causing the switch to stop powering the information handling system from the power adapter.

12. The power protection system of claim 11, further comprising:

powering the information handling system from a battery associated with the information handling system when the power adapter power capacity does not satisfy the power requirements of the information handling system, the battery being coupled between the power detector control circuit and the power distribution of the information handling system, the powering the information handling system from the battery being controlled by the power detector control circuit.

13. The power protection system of claim 11, further comprising:

circuitry for generating a low power warning via the adapter override circuit to inform a user that the power adapter power capacity does not satisfy the power requirements of the information handling system, the low power warning comprising a visual warning to warn the user of an adapter power condition.

14. The power protection system of claim 11, wherein:

the power adapter power capacity is detected via an adapter identifier.

15. The power protection system of claim 14, wherein:

the adapter identifier comprises a power supply identifier (PSID) signal, the PSID signal being provided to the information handling system via a single line bus.

* * * * *